United States Patent [19]

Frazer

[11] 4,065,432
[45] Dec. 27, 1977

[54] THERMALLY STABLE, RIGID POLYESTERS FROM AROMATIC DIBASIC ACIDS AND THERMALLY STABLE, RIGID BISPHENOLS

[75] Inventor: August Henry Frazer, Wilmington, Del.

[73] Assignee: E. I. Du Pont de Nemours and Company, Wilmington, Del.

[21] Appl. No.: 751,088

[22] Filed: Dec. 16, 1976

[51] Int. Cl.$^2$ .................. C08G 63/18; C08G 63/68
[52] U.S. Cl. .................. 260/47 C; 264/176 F; 560/61; 560/63
[58] Field of Search .......... 260/47 C, 473 S, 473 F; 264/176 F

[56] References Cited

U.S. PATENT DOCUMENTS

| | | | |
|---|---|---|---|
| 3,359,306 | 12/1967 | Farnham et al. | 260/521 |
| 3,511,808 | 5/1970 | Hodge et al. | 260/47 |
| 3,723,503 | 3/1973 | Dexter | 260/473 S |
| 3,792,075 | 2/1974 | Kaminaka et al. | 260/463 |

Primary Examiner—Lester L. Lee

[57] ABSTRACT

Thermally stable, rigid bisphenols of the formula

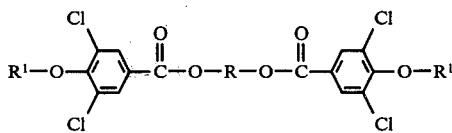

where R is

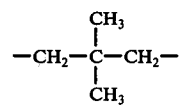

or

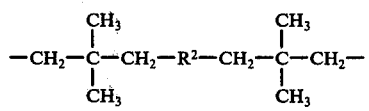

where
R$^2$ is arylene or substituted arylene, and
R$^1$ is hydrogen or acyl,
are used to prepare thermally stable, rigid, ordered polyesters of the formula

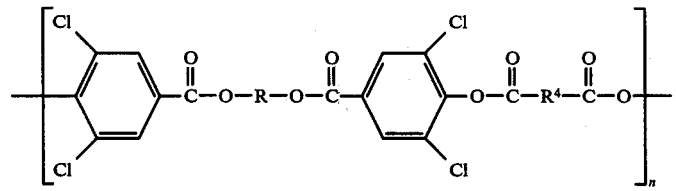

where
R$^4$ is arylene or substituted arylene, and
n is at least about 10.

9 Claims, No Drawings

THERMALLY STABLE, RIGID POLYESTERS FROM AROMATIC DIBASIC ACIDS AND THERMALLY STABLE, RIGID BISPHENOLS

BACKGROUND OF THE INVENTION

1. Field of the Invention

This invention is concerned with thermally stable, high tenacity, high modulus polyesters prepared from aromatic dibasic acids and thermally stable, rigid bisphenols containing no aliphatic beta-hydrogen atoms.

2. Description of the Prior Art

Polyester fibers such as those spun from polyethylene terephthalate have found wide commercial acceptance. These fibers, however, generally have limited thermal stability. A major pathway for thermal decomposition of known aliphatic-aromatic polyesters is thermal elimination at the site of aliphatic beta-hydrogens.

Polyesters having improved thermal stability have been prepared from terephthalic acid and neopentyl glycol. These polymers do not contain aliphatic beta-hydrogens. Such polyesters are described in British Pat. No. 828,922, French Pat. No. 1,392,313 and U.S. Pat. Nos. 3,194,794 and 3,498,952. These polyesters, however, are amorphous and thus have limited strength as fibers.

Komatsu et al in U.S. Pat. No. 3,705,130 show polyesters of the formula

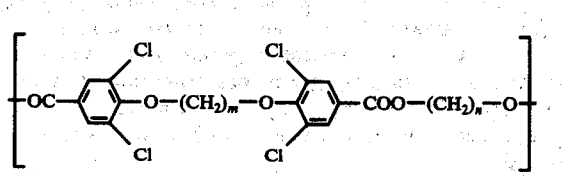

in which m is 2 or 4, n is 4 or 6, and n is larger than m. These polyesters are prepared by reaction of a compound of the formula

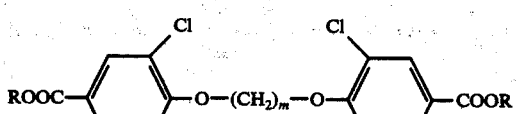

with a diol of formula HO—(CH$_2$)$_n$—OH. In this reaction there may be present up to 25% of many other dicarboxylic compounds and diols, including specifically terephthalic acid and neopentyl glycol. Fibers having melting points of 180°–300° C are obtained. The highest Initial Young's Modulus reported for these fibers is 61 grams per denier.

It would be desirable to provide new polyesters of superior thermal stability which could be melt spun into fibers characterized by high tenacity and high modulus. Such fibers would be useful, for example, as tire cords.

SUMMARY OF THE INVENTION

There have now been discovered thermally stable, rigid bisphenols of the formula

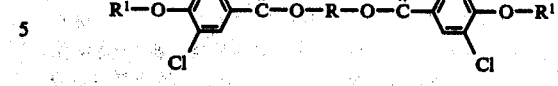

where R is

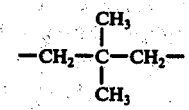

or

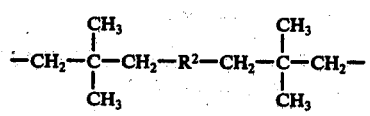

where
R$^2$ is an arylene selected from the group consisting of 1,4-phenylenes, 4,4'-biphenylenes and 2,6-naphthylenes, said arylene being unsubstituted or substituted with halo, lower alkyl or phenyl, and
R$^1$ is hydrogen or

where R$^3$ is a hydrocarbyl group of 1 to 10 carbon atoms selected from the group consisting of alkyl, aryl, aralkyl and alkaryl.

These rigid bisphenols are useful in the preparation of thermally stable, rigid, ordered polyesters of the formula

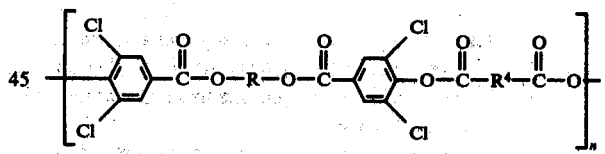

where R is

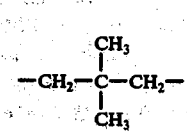

or

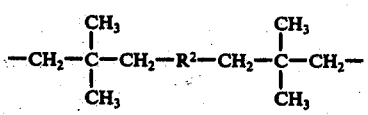

where
R$_2$ is an arylene selected from the group consisting of 1,4-phenylenes, 4,4'-biphenylenes, and 2,6- naphthylenes, said arylene being unsubstituted or substituted with halo, lower alkyl or phenyl, R⁴ is an arylene selected from the group consisting of 1,4-phenylenes, 4,4'-biphenylenes, 4,4'-biphenyleneoxides and 2,6-naphthylenes, said arylene being unsubstituted or substituted with halo, lower alkyl or phenyl, and $n$ is at least about 10.

The term "rigid" is used to denote the presence of a sufficient quantity of aromatic rings in the backbone of the molecule to provide stiffness. The term "halo" is intended to include chloro, bromo, fluoro, and iodo. The term "lower alkyl" is intended to include alkyls of 1 to 6 carbons. In the above definition of R² and R⁴, the substituted phenylene may have 1 to 4 of the specified substituents, the substituted biphenylene may have 1 to 8 of these substituents, and the substituted naphthylene may have 1 to 6 of these substituents.

DESCRIPTION OF THE PREFERRED EMBODIMENT

The thermally stable, rigid bisphenols and bisphenol esters of this invention are of the formula

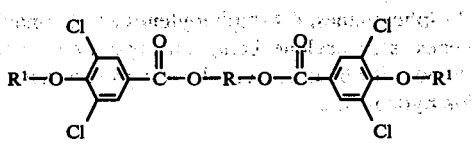

in which R and R¹ are as defined above.

The rigid bisphenols of this invention are prepared by reacting neopentyl glycol or a rigid diol of the formula

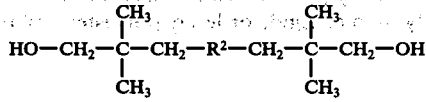

where R² is an arylene or substituted arylene as defined above with a lower alkyl 3,5-dichloro-4-hydroxybenzoate at elevated temperatures in the presence of calcium acetate and antimony oxide.

The rigid diols are prepared by reacting a lower alkyl isobutyrate such as methyl isobutyrate with an α,α'-dibromo aromatic compound such as α,α'-dibromo-p-xylene in the presence of the reaction product of a lower alkyllithium such as n-butyllithium with a hindered secondary amine such as diisopropylamine to form a 1,4-bis(2-carbomethoxy-2-methylpropyl)benzene in accordance with the equation:

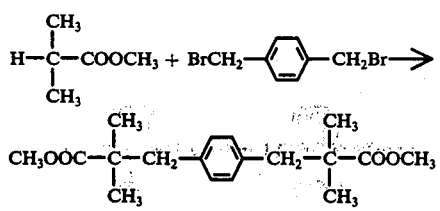

This product is then reduced with lithium aluminum hydride to form the rigid diol in accordance with the equation:

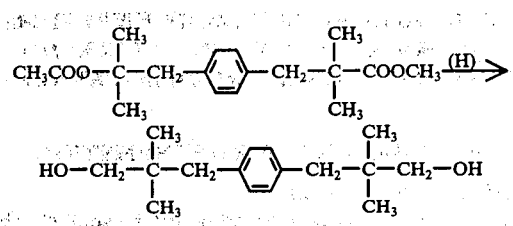

The various different arylene groups are obtained by substituting a different α,α'-dibromo aromatic compound for the α,α'-dibromo-p-xylene. Suitable α,α'-dibromo aromatic compounds include α,α'-dibromo-p-xylene
α,α'-dibromo-p,p'-bitolyl
2,6-bis-(bromomethyl)naphthylene
α,α'-dibromo-2-chloro-p-xylene
α,α'-dibromo-2-methyl-p-xylene
α,α',2-tribromo-p-xylene
2,5-bis(bromomethyl)biphenyl
4,4'-bis(bromomethyl)-3,3'-difluorobiphenyl
3,6-bis(chloromethyl)durene
3,3'-dichloro-4,4'-bis (bromomethyl)biphenyl
1,5-dichloro-2,6-bis(bromomethyl)naphthalene
1-chloro-2,6-bis(bromomethyl)naphthalene
and the like.

The rigid bisphenol esters in which R¹ is

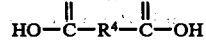

are prepared by reacting the corresponding rigid bisphenol in which R¹ is H with a carboxylic acid anhydride by known esterification procedures. Suitable anhydrides for preparing the corresponding bisphenol esters include acetic, propionic, n-butyric, benzoic, phenylacetic, p-toluic and α-naphthoic anhydrides, and the like.

The thermally stable, rigid, ordered polyesters of this invention are of the formula

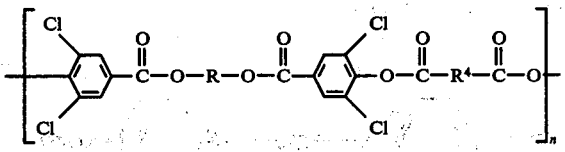

in which R, R⁴ and $n$ are as defined above. These polyesters are prepared by reacting a rigid bisphenol or bisphenol ester of this invention with an aromatic dibasic acid of the formula $$HO-\overset{O}{\underset{\|}{C}}-R^4-\overset{O}{\underset{\|}{C}}-OH$$

in which R⁴ is as defined above.

Suitable aromatic diabasic acids for preparing the polyesters of this invention are known compounds which include:
terephthalic acid
chloroterephthalic acid
methylterephthalic acid
ethylterephthalic acid
4,4'-biphenyldicarboxylic acid
4,4'-oxydibenzoic acid
3,3'-dimethyl-4,4'-oxydibenzoic acid 2-methyl-4,4'-biphenyldicarboxylic acid
2,6-naphthalenedicarboxylic acid
tetrafluoroterephthalic acid
tetrachloroterephthalic acid
tetrabromoterephthalic acid
tetraiodoterephthalic acid
tetramethylterephthalic acid
2,5-diphenylterephthalic acid
2,2',3,3',5,5',6,6'-octofluoro-4,4'-biphenyldicarboxylic acid
2,2'-dibromo-4,4'-biphenyldicarboxylic acid 2,2', 6,6'-tetrachloro-4,4'-biphenyldicarboxylic acid
2,2'-diiodo-4,4'-biphenyldicarboxylic acid
2,2'-dimethyl-4,4'-biphenyldicarboxylic acid
1,3,4,5,7,8-hexachloro-2,6-naphthalenedicarboxylic acid
and the like.

The polyesters of this invention are prepared by melt polymerization, that is, heating the dibasic acid and the bisphenol or bisphenol ester at a temperature above the melting point of the ingredients. A diester of the bisphenol is generally used rather than the bisphenol itself because of the lower melting point of the diester. When a faster reaction is desired, the bisphenol itself can be used.

The ordered polyesters of this invention are characterized by superior thermal stability, high tenacity and high stiffness modulus. A contributing factor in the superior thermal stability is the absence of β-hydrogens in the aliphatic portions of the molecule. These ordered polyesters have superior thermal stability in high temperature melt polymerizations, in high temperature melt spinning, and in extrusion operations.

The chain stiffness or rigidity imparted by the aromatic segments in the polymers contributes to the high tenacity and high stiffness modulus of fibers spun from the polymers. Many of these polymers yield oriented fibers directly from melt spinning. A particularly preferred group of the polymers of this invention are those having glass transition temperatures above 150° C. Fibers of these polymers have the practical advantages of high strength and high modulus at elevated temperatures. The polyesters of this invention are especially useful for preparing tire cords.

EXAMPLES OF THE INVENTION

The following examples illustrate the preparation of the thermally stable, rigid bisphenols of this invention and their use in the preparation of the thermally stable, rigid, ordered polyesters of this invention. In the examples the following tests and designations were employed.

Polymer melt temperature (PMT) is that temperature at which a fresh polymer sample leaves a wet molten trail when stroked with moderate pressure across a clean, heated metal surface. A temperature-gradient bar covering the range of 50°–400° C was used for this determination (Beaman and Cramer, J. Polymer Sci., XXI, Page 227).

Inherent viscosity was determined at 0.5% concentration and 30° C in a 40/60 weight mixture of 1,1,2,2-tetrachloroethane and phenol.

The standard fiber test designation T/E/Mi refers to tensile strength in grams per denier, elongation in percent, and initial modulus in grams per denier.

Orientation angle was determined by the method described by Kwolek in U.S. Pat. No. 3,671,542 at Column 20, lines 8–41.

EXAMPLE 1

Part A

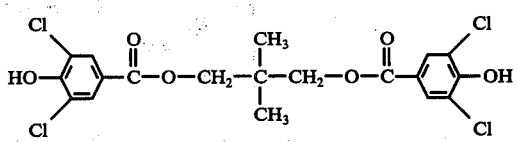

A mechanically stirred mixture of 0.6 g of calcium acetate, 0.6 g of antimony oxide, 15.7 g (0.15 M) of 2,2-dimethyl-1,3-propanediol, and 132 g (0.6 mole) of methyl 3,5-dichloro-4-hydroxybenzoate was heated under a nitrogen atmosphere at 200° C for 18 hours. The reaction mixture was washed three times with benzene in a Waring Blendor and extracted for five days with 2 liters of hot benzene. The extract, on cooling, yielded 50.5 g of 4,4'-[2,2-dimethyl-1,3-propanediylbis(oxycarbonyl)]bis-(2,6-dichlorophenol) melting at 180°–181° C. The infrared spectrum was consistent with the indicated structure. The compound contained 4.115 meq. of OH/g, indicating a molecular weight of 486 for the bisphenol.

Part B

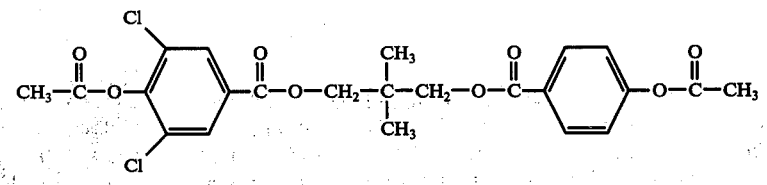

A mixture of 50 g of the bisphenol from Part A and 400 ml of acetic anhydride was heated to the boil for one hour, concentrated to 200 ml, and filtered hot. On cooling, the reaction mixture yielded the bisphenol diacetate which after three washes with distilled $H_2O$ and drying at 120° C in a vacuum oven overnight weighed 45.6 g and had a melting point of 121°–122° C. The infrared spectrum was consistent with the proposed structure and the compound was found to have a molecular weight by mass spec. of 564.

Part C

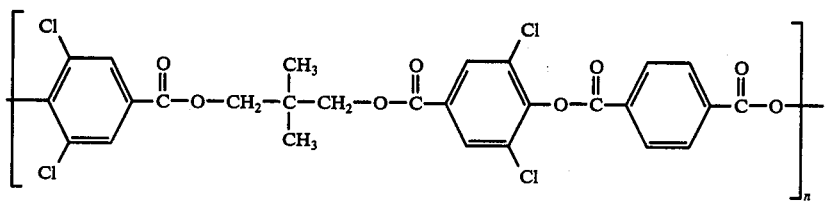

To a glass reactor with a nitrogen bleed and sidearm was added 1.044 g (0.00185 M) of the bisphenol diacetate of Part B and 0.34 g (0.0021 M) of terephthalic acid. The resulting mixture under a nitrogen atmosphere was heated for 18 hr at 275° C and for 5.5 hr at 305° C, followed by 2 hr at 305° C and less than 0.05 mm Hg pressure. The resulting poly[oxycarbonyl(1,4-phenylene)carbonyloxy(2,6-dichloro-1,4-phenylene)-carbonyloxy(2,2-dimethyl-1,3-propanediyl)oxycarbonyl(3,5-dichloro-1,4-phenylene)], which had a PMT of 320° C, could be manually spun into fiber at approximately 270° C, had an inherent viscosity of 0.43, and was amorphous by X-ray diffraction.

EXAMPLE 2

Part A

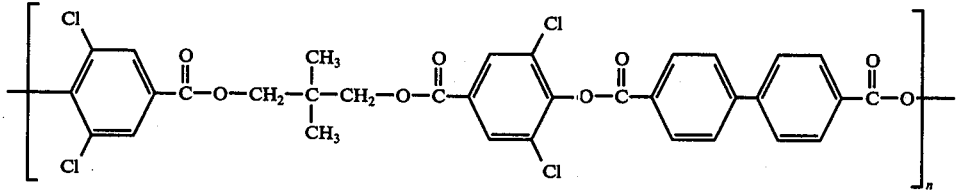

To a glass reactor with a nitrogen bleed and sidearm was added 14.15 g (0.025 M) of the bisphenol diacetate from Example 1, Part B, and 6.277 g (0.0259 M) of bibenzoic acid. The resulting mixture under a nitrogen atmosphere was heated fro 24 hours at 255° C and for 6 hours at 275° C, followed by 3 hours at 275° C and less than 0.05 mm Hg pressure. The resulting poly[oxycarbonyl(1,1'-biphenyl)-4,4'-diylcarbonyloxy(2,6-dichloro-1,4-phenylene)carbonyloxy (2,2-dimethyl-1,3-propanediyl)oxycarbonyl(3,5-dichloro-1,4-phenylene)] had a PMT of approximately 400° C, an inherent viscosity of 1.25, and showed trace crystallinity by X-ray diffraction.

Part B

Polymer from Part A was spun at a spinneret temperature of 375° C and the fiber was wound up at 500 yd/min. The fiber, after being drawn 3.5 times at 250° C, had an orientation angle of 20°, was of medium crystallinity, had a T/E/Mi at room temperature of 8/6/260 and a T/E/Mi at 150° C of 6/5/200.

EXAMPLE 3

Part A

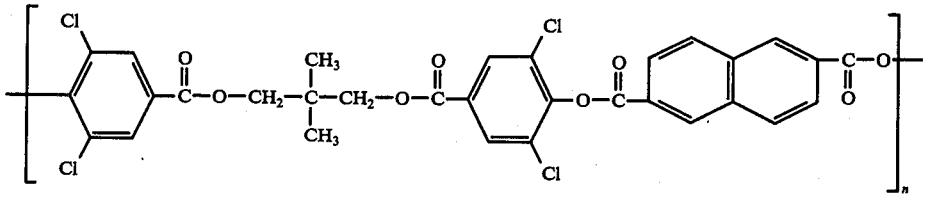

The procedure of Example 2, Part A, was repeated with the exception that 5.603 g (0.0259 M) of 2,6-naphthalenedicarboxylic acid was used in place of the bibenzoic acid. The resulting poly[oxycarbonyl(2,6-naphthalene)diylcarbonyloxy(2,6-dichloro-1,4-phenylene)-carbonyloxy(2,2-dimethyl-1,3-propanediyl)oxycarbonyl(3,5-dichloro-1,4-phenylene)] had a PMT of approximately 400° C, an inherent viscosity of 1.25, and showed trace crystallinity by X-ray diffraction.

Part B

Polymer from Part A was spun at a spinneret temperature of 370° C and the fiber wound up at 500 yd/min. The fiber, after being drawn 3.5 times at 250° C, had an orientation angle of 21°, was of medium crystallinity, had a T/E/Mi at room temperature of 6/6/260 and a T/E/Mi at 150° C of 4/5/200.

EXAMPLE 4

Part A $$CH_3OOC-\overset{CH_2}{\underset{CH_3}{\overset{|}{C}}}-CH_2-\underset{}{\bigcirc}-CH_2-\overset{CH_3}{\underset{CH_3}{\overset{|}{C}}}-COOCH_3$$

To 1 liter of dry tetrahydrofuran was added 52 g of diisopropylamine. The mixture was cooled to −78° C and 325 ml of 1.6 M n-butyllithium in hexane was added. After 1 hour of stirring 52 g of methyl isobutyrate was added dropwise followed by stirring for another 30 minutes. Then 63 g of α, α'-dibromo-p-xylene was slowly added. The reaction mixture was stirred overnight and brought to room temperature. The mixture was filtered and solvent was removed from the filtrate by evaporation. The residue was recrystallized from methanol to obtain 63 g of 1,4-bis(2-carbomethoxy-2methylpropyl)benzene, m.p. 74°–76° C.

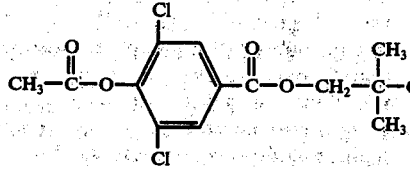

Part B

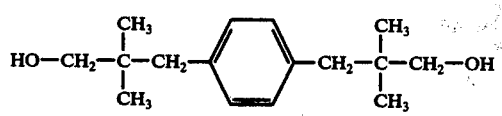

To 500 ml of dry tetrahydrofuran was added 11.4 g of lithium aluminum hydride and 60 g of 1,4-bis(2-carbomethoxy-2-methylpropyl)benzene. The mixture was stirred overnight at room temperature. To the thick reaction mixture was added 300 ml of ethyl acetate, 30 ml of saturated aqueous NH₄Cl and 5 ml of conc. HCl. The mixture was stirred and filtered. Solvent was evaporated from the filtrate and the residue was recrystallized from benzene to obtain 20 g of 1,4-bis(3-hydroxy-2,2-dimethylpropyl)benzene. The solid from the above filtration was slurried with 50 ml of H₂O, 20 ml of conc. HCl and 150 ml of benzene and heated at reflux for 1 hour. The benzene layer was then separated, dried over MgSO₄ at 80° C, filtered hot, and then cooled to precipitate an additional 10 g of 1,4-bis(3-hydroxy-2,2-dimethylpropyl)-benzene, m.p. 104°–105° C.

Part C

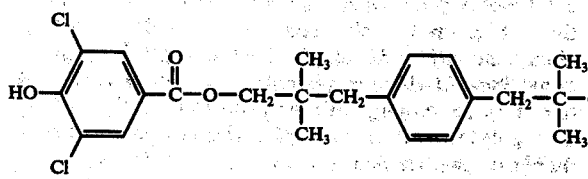

A mechanically stirred mixture of 0.6 g of calcium acetate, 0.6 g of antimony oxide, 3.75 g (0.15 M) of 1,4-bis(3-hydroxy-2,2-dimethylpropyl)benzene and 132 g (0.6 M) of methyl 3,5-dichloro-4-hydroxybenzoate was heated under nitrogen atmosphere at 200° C for 18 hours. The reaction mixture was washed three times with benzene in a Waring Blendor and extracted for 5 days with 2 liters of hot benzene. The extract, on cooling, yielded 70 g of 4,4'-[1,4-phenylenebis([2,2-dimethyl-1,3-propanediyl]-oxycarbonyl)]bis(2,6-dichlorophenol) melting at 203°–204° C. The infrared spectrum was consistent with the indicated structure. The compound contained 3.185 meq. of OH/g indicating a molecular weight of 628 for the bisphenol.

Part D

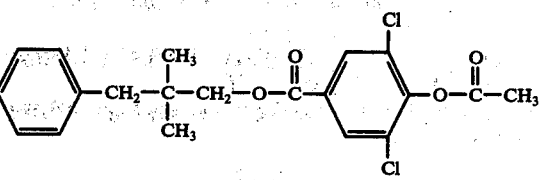

A mixture of 70 g of the bisphenol from Part C and 400 ml of acetic anhydride was heated to the boil for one hour, concentrated to 200 ml, and filtered hot. On cooling, the reaction mixture yielded the bisphenol diacetate which after three washes with distilled H₂O and drying at 120° C in a vacuum oven overnight weighed 73.4 g and had a melting point of 167°–168° C. The infrared spectrum was consistent with the proposed structure, and the compound was found to have a molecular weight by mass spec. of 712.

PART E

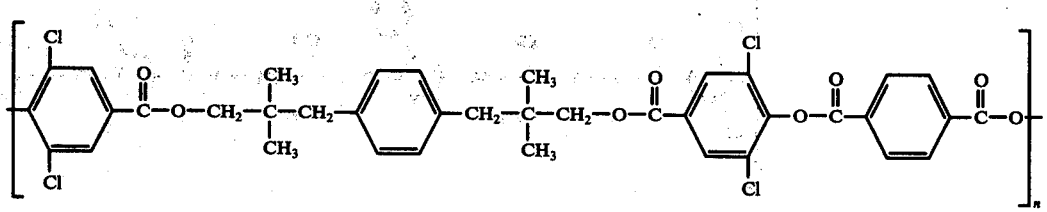

To a glass reactor with a nitrogen bleed and sidearm was added 0.709 g (0.000996 M) of the bisphenol diacetate of Part D and 0.166 g (0.001 M) of terephthalic acid. The resulting mixture under a nitrogen atmosphere was heated for 20 hours at 275° C, for 2¾ hours at 305° C, for ½ hour at 320° C, and for 1½ hour at 340°, followed by 6 hours at 320° C at less than 0.05 mm Hg pressure. The resulting poly]oxycarbonyl(1,4-phenylene)-carbonyloxy(2,6-dichloro-1,4-phenylene)-carbonyloxy(2,2-dimethyl-1,3-propanediyl)(1,4-phenylene)(2,2-dimethyl-1,3-propanediyl)oxycarbonyl(3,5-dichloro-1,4-phenylene)] which had a PMT of approximately 380° C, could be manually spun into fiber at 330° C, had an inherent viscosity of 0.48 and showed trace crystallinity.

PART F

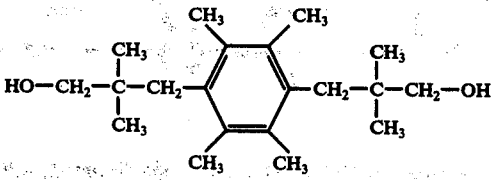

The procedure of Example 4, Part A, was repeated except that 3,6-bis(chloromethyl)durene was substituted for α,α'-dibromo-p-xylene. The diol obtained in the procedure of Part B was 1,4-bis(2,2-dimethyl-3-hydroxypropyl)tetramethyl benzene (m.p. = 147.5°–149° C, from methanol).

Anal. Calcd. for $C_{20}H_{34}O_2$: C, 78.38; H, 11.18. Found: C, 78.76; H, 11.24. 78.98 11.16.

The infrared spectfum (KBr) contained an OH stretch band at 2.98 μ

Part G

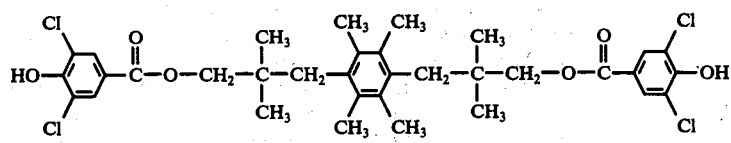

When the diol of Part F above is substituted for 1,4-bis(3-hydroxy-2,2-dimethylpropyl)benzene in the procedure of Example 4, Part C, the bisphenol obtained is 4,4'-[2,3,5,6-tetramethyl-1,4-phenylenebis([2,2-dimethyl-1,3-propanediyl]-oxycarbonyl)]bis(2,6-dichlorophenol).

Part H

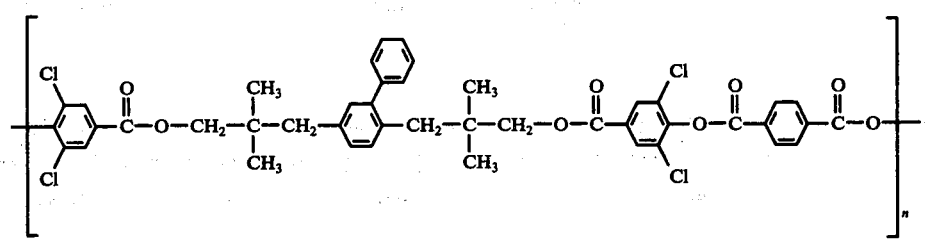

When the bisphenol of Part G above is substituted for the bisphenol of Example 4, Part C, in the procedure of Part D, and the resulting bisphenol diacetate is substituted for the bisphenol diacetate of Part D in the procedure of Part E, the polymer obtained is poly[oxycarbonyl(1,4-phenylene)-carbonyloxy(2,6-dichloro-1,4-phenylene)carbonyloxy(2,2-dimethyl-1,3-propanediyl)(2,3,5,6-tetramethyl-1,4-phenylene)-(2,2-dimethyl-1,3-propanediyl)oxycarbonyl(3,5-dichloro-1,4- phenylene)].

Part I

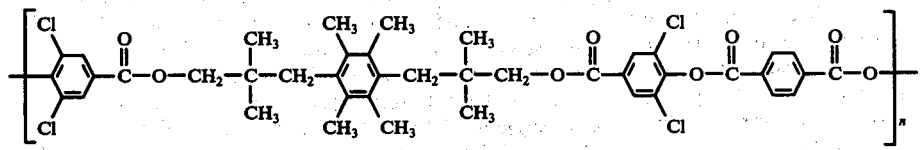

When α,α', 2-tribromo-p-xylene [Hazlet et al., J. Org. Chem., 29, 2034–6 (1964)] is substituted for α,α'-dibromo-p-xylene in the procedure of Example 4, Part A, the diol obtained in the procedure of part B is 1,4-bis(3-hydroxy-2,2-dimethylpropyl)-2-bromobenzene.

When this diol is substituted for 1,4-bis(3-hydroxy-2,2-dimethylpropyl)benzene in the procedure of Part C, the bisphenol obtained is 4,4'-[1-bromo-1,4-phenylenebis([2,2-dimethyl-1,3-propanediyl]oxycarbonyl)]-bis(2,6-dichlorophenol), and the polymer obtained by continuing with the procedure of Parts D and E is poly-[oxycarbonyl(1,4-phenylene)carbonyloxy(2,6-dichloro-1,4-phenylene)carbonyloxy(2,2-dimethyl-1,3-propanediyl)(1-bromo-1,4-phenylene)(2,2-dimethyl-1,3-propanediyl)oxycarbonyl(3,5-dichloro-1,4-phenylene)].

Part J

When 2,5-bis(bromomethyl)biphenyl (U.S. Pat. No. 3,399,124) is substituted for α,α'-dibromo-p-xylene in the procedure of Example 4, Part A, the diol obtained in the procedure of part B is 2,5-bis(3-hydroxy-2,2-dimethylpropyl)biphenyl.

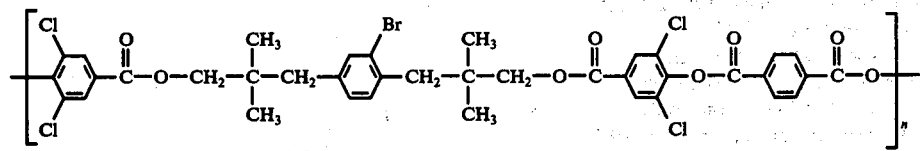

When this diol is substituted for 1,4-bis-(3-hydroxy-2,2-dimethylpropyl)benzene in the procedure of Part C, the bisphenol obtained is 4,4'-[2-phenyl-1,4-phenylenebis([2,2-dimethyl-1,3-propanediyl]oxycarbonyl)]bis-(2,6-dichlorophenol), and the polymer obtained by continuing with the procedure of Parts D and E is poly]oxycarbonyl(1,4-phenylene)carbonyloxy(2,6-dichloro-1,4-phenylene)carbonyl- oxy(2,2-dimethyl-1,3-propanediyl)(2-phenyl-1,4-phenylene)-(2,2-dimethyl-1,3-propanediyl)oxycarbonyl(3,5-dichloro-1,4-phenylene)].

Part K

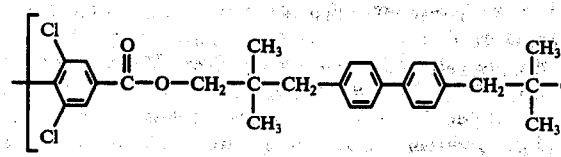

When an equivalent amount of α,α'-dibromo-p,p'-bitolyl is used in place of the α,α'-dibromo-p-xylene following the procedure of Example 4, Part A, the glycol obtained following the procedure of Part B is 4,4'-bis(3-hydroxy-2,2-dimethylpropyl)biphenyl; the bisphenol diacetate obtained following the procedure of Part D is the diacetate of 4,4'[4,4'-biphenyldiylbis([2,2-dimethyl-1,3-propanediyl]-oxycarbonyl)]bis(2,6-dichlorophenol) and the polymer obtained following the procedure of Part E is poly[oxycarbonyl(1,4-phenylene)carbonyloxy(2,6-dichloro-1,4-phenylene)-carbonyloxy (2,2-dimethyl-1,3-propanediyl)(1,1'-biphenyl)-4,4'-diyl(2,2-dimethyl-1,3-propanediyl)oxycarbonyl(3,5-dichloro-1,4-phenylene)].

Part L

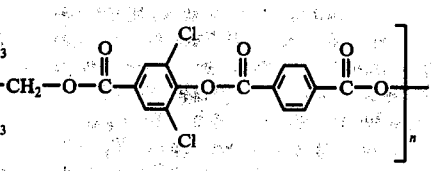

In a 2-liter flask equipped with a reflux condenser capped with a nitrogen bubbler was placed 83.7 g of 3,3'-dichloro-4,4'-bitolyl, 121.5 g of N-bromosuccinimide, 4.0 g of benzoyl peroxide, 630 ml of carbon tetrachloride, and a few boiling chips. The mixture was refluxed for 21½ hours and cooled to room temperature. Four grams of benzoyl peroxide was added and reflux was continued for 8 hours. The mixture was filtered hot and the solid was rinsed on the filter with 500 ml of hot carbon tetrachloride. Cooling the combined filtrate and rinsings gave 75.5 g of crude 3,3'-dichloro-4,4'-bis(bromomethyl)biphenyl melting at 148°-154° C. The recrystallization from chloroform raised the melting point to 159°-161° C.

Anal. Calcd. for $C_{14}H_{10}Cl_2Br_2$: C, 41.11; H, 2.47; Br, 39.08; Cl, 17.34. Found: C, 41.27; H, 2.68; Br, 38.62; Cl, 17.23. 41.12 2.57 38.58 17.26.

The procedure of Example 4, Part A, was repeated except that the material was substituted for α,α'-dibromo-p-xylene. The diol obtained in the procedure of Part B was 3,3'-dichloro-4,4'-bis(3-hydroxy-2,2-dimethylpropyl)biphenyl (m.p. = 134.75°-135.75° C from chloroform).

Anal. Calcd. for $C_{22}H_{28}Cl_2O_2$: C, 66.83; H, 7.14; Cl, 17.94. Found: C, 66.86; H, 6.73; Cl, 17.40. 66.78 7.01 17.89.

The infrared spectrum (KBr) contained an OH stretch band at 3.00 μ.

Part M

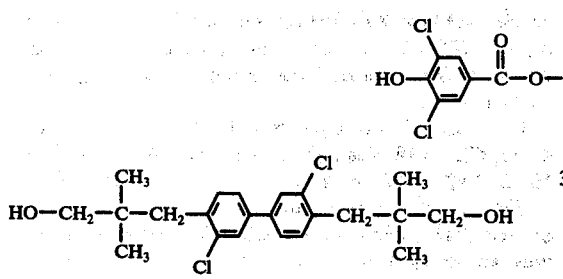

When the diol of part L above is substituted for 1,4-bis(3-hydroxy-2,2-dimethylpropyl)benzene in the procedure of Example 4, Part C, the bisphenol obtained is 4,4'[3,3'-dichloro-4,4'-biphenylenebis([2,2-dimethyl-1,3-propanediyl]oxycarbonyl)]bis(2,6-dichlorophenol).

Part N

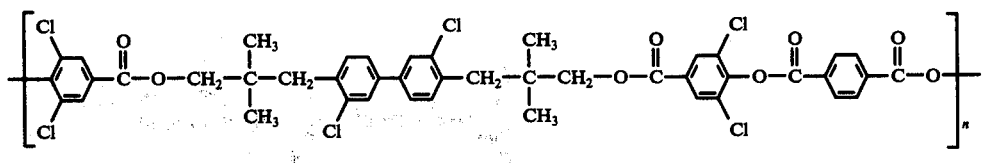

When the bisphenol of Part M above is substituted for the bisphenol of Example 4, Part C, in the procedure of Part D, and the resulting bisphenol diacetate is substituted for the bisphenol diacetate of Part D in the procedure of Part E, the polymer obtained is poly[oxycarbonyl(1,4-phenylene)carbonyloxy(2,6-dichloro-1,4-phenylene)carbonyloxy(2,2-dimethyl-1,3-propanediyl)(3,3'-dichloro-1,1'-biphenyl)-4,4'-diyl(2,2-dimethyl-1,3-propanediyl)oxycarbonyl-(3,5-dichloro-1,4-phenylene)].

PART O

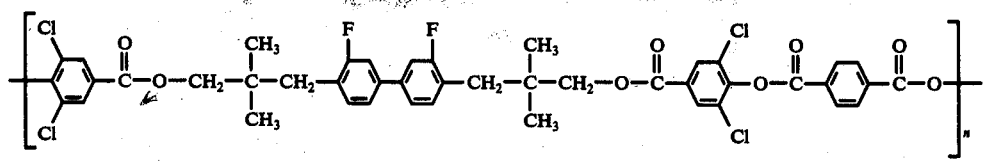

when 4,4'-bis(bromomethyl)-3,3'-difluorobiphenyl, prepared by coupling 2-fluoro-4-iodotoluene followed by bromination, is substituted for α,α'-dibromo-p-xylene in the procedure of Example 4, Part A, the diol obtained in the procedure of Part B is 4,4'-bis(3-hydroxy-2,2-dimethylpropyl)-3,3'-difluorobiphenyl.

When this diol is substituted for 1,4-bis(3-hydroxy-2,2-dimethylpropyl)benzene in the procedure of Part C, the bisphenol obtained is 4,4'-[3,3'-difluoro-4,4'-biphenylenebis([2,2-dimethyl-1,3-propanediyl]oxy-carbonyl)]bis (2,6-dichlorophenol), and the polymer obtained by continuing with the procedure of Parts D and E is poly[oxycarbonyl(1,4-phenylene)carbonyloxy(2,6-dichloro-1,4-phenylene)carbonyloxy(2,2-dimethyl-1,3-propanediyl)(3,3'-difluoro-1,1'-biphenyl)-4,4'-diyl(2,2-dimethyl-1,3-propanediyl)oxycarbonyl(3,5-dichloro-1,4-phenylene)].

Part P

In a 1-liter flask equipped with a reflux condenser capped with a nitrogen T-tube was placed 41.0 g of 1-chloro-2,6-dimethylnaphthalene, 80 g of N-bromosuccinimide, 0.20 g of benzoyl peroxide, 475 ml of carbon tetrachloride and a few boiling chips. The mixture was refluxed for three hours and cooled to room temperature. After 0.30 g of α,α'-azobis(isobutyronitrile) was added, refluxing was continued for 17½ hours. After the mixture had been cooled to room temperature, it was filtered. The solid was rinsed on the filter with carbon tetrachloride and dried. Stirring of this solid with 500 ml of water for 2 hours, followed by filtration, rinsing of the solid on the filter with water, and drying, yielded 30.30 g of crude 1-chloro-2,6-bis- (bromomethyl)naphthalene melting at 127°–129° C.

The filtrate from the first filtration was evaporated to 100 ml and refrigerated for several hours. Filtration of the resulting solid, rinsing on the filter with carbon tetrachloride, and drying yielded another 23.80 g of

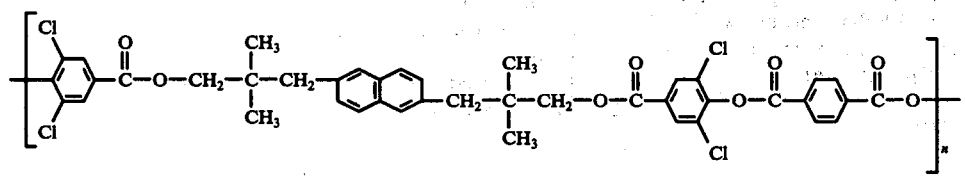

crude 1-chloro-2,6-bis(bromomethyl)naphthalene melting at 120°–128° C. Recrystallization of the combined products from chloroform raised the melting point to 131°–133° C.

Anal. Calcd. for $C_{12}H_9Br_2Cl$: C, 41.36; H, 2.60; Br, 45.87; Cl, 10.18. Found: C, 40.28; H, 2.51; Br, 46.96; Cl, 10.53. 40.22 2.52 46.79 10.52.

The procedure of Example 4, Part A, was repeated except that 1-chloro-2,6-bis(bromomethyl)naphthalene was substituted for α,α'-dibromo-p-xylene. The diol obtained in the procedure of Part B was 1-chloro-2,6-bis(3-hydroxy-2,2-dimethylpropyl)naphthalene (m.p. = 144°–145.5° C).

By a similar substitution of an equivalent amount of 2,6-bis(bromomethyl)naphthalene for the α,α'-dibromo-p-xylene in the procedure of Example 4, Part A, the glycol obtained in the procedure of Part B is 2,6-bis(3-hydroxy-2,2-dmethylpropyl)naphthalene; the bisphenol diacetate obtained in the procedure of Part D is the diacetate of 4,4'-[2,6-naphthylenebis([2,2-dimethyl-1,3-propanediyl]oxycarbonyl)]-bis(2,6-dichlorophenol) and the polymer obtained in the procedure of Part E is poly[oxycarbonyl(1,4-phenylene)carbonyloxy (2,6-dichloro-1,4-phenylene)carbonyloxy(2,2-dimethyl- 1,3-propanediyl)(2,6-naphthylene)(2,2-dimethyl-1,3-propane-diyl)oxycarbonyl(3,5-dichloro-1,4-phenylene)].

Part Q

Part R

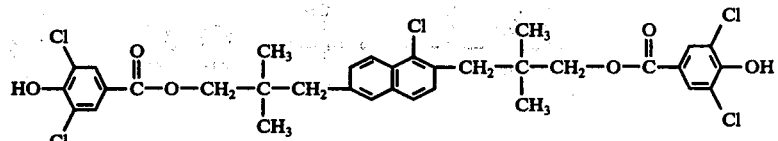

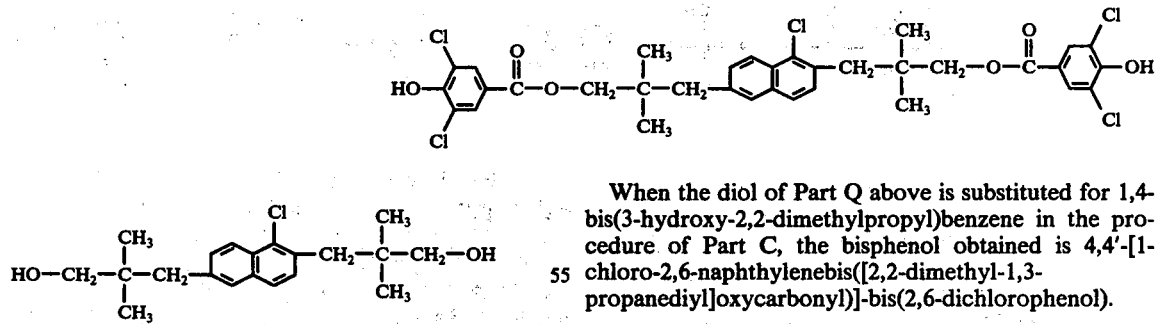

When the diol of Part Q above is substituted for 1,4-bis(3-hydroxy-2,2-dimethylpropyl)benzene in the procedure of Part C, the bisphenol obtained is 4,4'-[1-chloro-2,6-naphthylenebis([2,2-dimethyl-1,3-propanediyl]oxycarbonyl)]-bis(2,6-dichlorophenol).

Part S

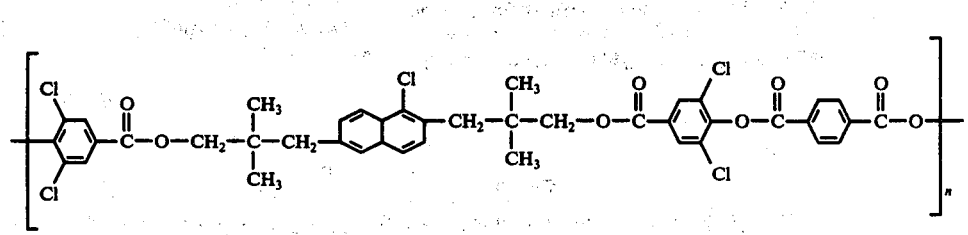

When the bisphenol of Part R above is substituted for the bisphenol of Example 4, Part C, in the procedure of Part D, and the resulting bisphenol diacetate is substituted for the bisphenol diacetate of Part D in the procedure of Part E, the polymer obtained is poly[oxycarbonyl- (1,4-phenylene)carbonyloxy(2,6-dichloro-1,4-phenylene)carbonyloxy(2,2-dimethyl-1,3-propanediyl)(1-chloro-2,6-naphthylene)(2,2-dimethyl-1,3-propanediyl)oxycarbonyl(3,5-dichloro-1,4-phenylene)].

Part T

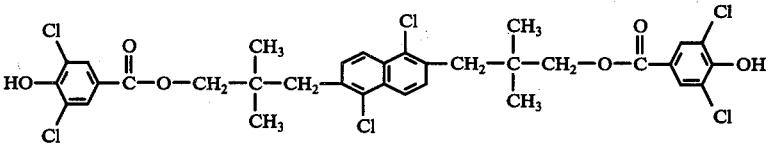

In a 250 ml flask equipped with a reflux condenser capped with a nitrogen T-tube was placed 12.10 g of 1.5-dichloro-2,6-dimethylnaphthalene, 20 g of N-bromo succinimide, 0.10 g of benzoyl peroxide, 120 ml of carbon tetrachloride and a few boiling chips. The mixture was refluxed for 3 hours and cooled to room temperature. After 0.20 g of α,α'-azobis(isobutyronitrile) was added, refluxing was continued for 16½ hours. After the mixture had cooled to room temperature, the precipitated solid was filtered, rinsed on the filter with carbon tetrachloride and dried. Stirring of this solid for 2½ hours with 400 ml of water, followed by filtration and drying of the solid on the filter, gave 14.03 g of crude 1,5-dichloro-2,6-bis-(bromomethyl)naphthalene melting at 219°–221° C. Recrystallization from refluxing toluene raised the melting point to 221°–222.5° C.

Anal. Calcd. for $C_{12}H_8Br_2Cl_2$: C, 37.64; H, 2.10; Br, 41.74; Cl, 18.52. Found: C, 38.11; H, 2.27; Br, 42.40; Cl, 18.04. 38.10 2.21 42.24 18.12.

The procedure of Example 4, Part A, was repeated except that the above material was substituted for α,α'-dibromo-p-xylene. The diol obtained in the procedure of Part B was 1,5-dichloro-2,6-bis(3-hydroxy-2,2-dimethylpropyl)naphthalene (m.p. = 213¾°–214¾° C, from alcohol).

Anal. Calcd. for $C_{20}H_{26}Cl_2O_2$: C, 65.04; H, 7.10; Cl, 19.20. Found: C, 65.31; H, 7.14; Cl, 18.91. 64.85 7.16 18.99 64.95 7.28.

The infrared spectrum (KBr) contained an OH stretch band at 3.00 μ.

Part U

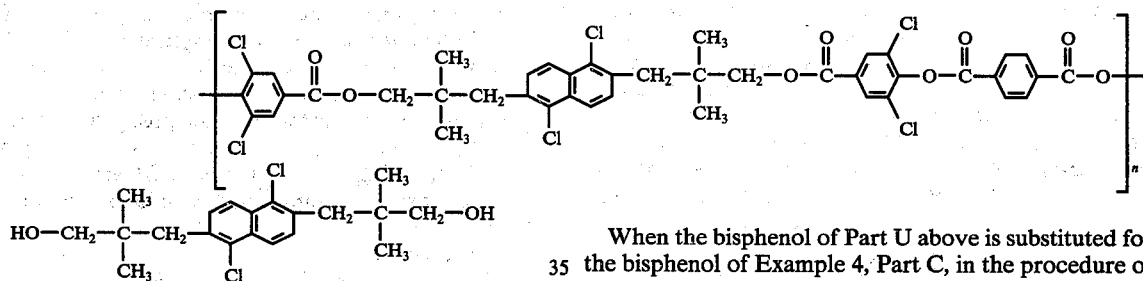

When the diol of Part T above is substituted for 1,4-bis(3-hydroxy-2,2-dimethylpropyl)benzene in the procedure of Example 4, Part C, the bisphenol obtained is 4,4'-[1,5-dichloro-2,6-naphthylenebis([2,2-dimethyl-1,3-propanediyl]oxycarbonyl)]bis(2,6-dichlorophenol).

Part V

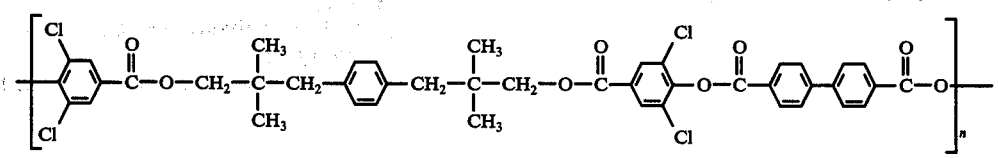

When the bisphenol of Part U above is substituted for the bisphenol of Example 4, Part C, in the procedure of Part D, and the resulting bisphenol diacetate is substituted for the bisphenol diacetate of Part D in the procedure of Part E, the polymer obtained is poly[oxycarbonyl(1,4-phenylene)carbonyloxy(2,6-dichloro-1,4-phenylene)-carbonyloxy(2,2-dimethyl-1,3-propanediyl)(1,5-dichloro-2,6-naphthylene)(2,2-dimethyl-1,3-propanediyl)oxycarbonyl(3,5-dichloro-1,4-phenylene)].

EXAMPLE 5

Part A

To a glass reactor with a nitrogen bleed and sidearm was added 22.528 g (0.032 M) of the bisphenol diacetate of Example 4, Part D, and 7.938 g (0.0328 M) of bibenzoic acid. Under a nitrogen atmosphere the resulting mixture was heated for 36 hours at 255° C and for 6 hours at 275° C, followed by 3 hours at 275° C and less than 0.05 mm Hg pressure. The resulting poly[oxycarbonyl(1,1'-biphenyl)-4,4'-diylcarbonyloxy(2,6-dichloro-1,4-phenylene)carbonyloxy(2,2-dimethyl-1,3-propanediyl)(1,4-phenylene)(2,2-dimethyl1,3-propanediyl)oxycarbonyl(3,5-dichloro-1,4-phenylene)] had a PMT of approximately 400° C, an inherent viscosity of 1.25, and showed low crystallinity by X-ray diffraction.

Part B

Polymer from Part A was spun at a spinneret temperature of 370°–375° C and the fiber was wound up at 500 yd/min. The fiber could not be drawn and after being heated at 260° C for 18 hours under restrained conditions under a nitrogen atmosphere, had an orientation angle of 14°, was of medium-to-high crystallinity, had a T/E/Mi at room temperature of 16/5/270 and a T/E/Mi at 150° C of 11/5/210.

EXAMPLE 6

Part A

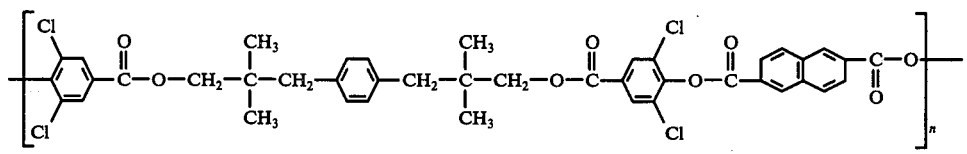

To a glass reactor with a nitrogen bleed and sidearm was added 22.528 g (0.032 M) of the bisphenol diacetate of Example 4, Part D, and 7.085 g (0.0328 M) of 2,6-naphthalenedicarboxylic acid. This mixture was heated under nitrogen by the procedure shown in Example 5, Part A. The resulting poly[oxycarbonyl(2,6-naphthalene)diylcarbonyloxy(2,6-dichloro-1,4-phenylene)-carbonyloxy(2,2-dimethyl-1,3-propanediyl)(1,4-phenylene)(2,2-dimethyl-1,3-propanediyl) oxycarbonyl(3,5-dichloro-1,4-phenylene)] had a PMT of approximately 400° C, an inherent viscosity of 1.25, and showed low crystallinity by X-ray diffraction.

Part B

Polymer from Part A was spun at a spinneret temperature of 370°–375° C and the fiber was wound up at 500 yd/min. The fiber could not be drawn and after being heated at 260° C for 18 hours under restrained conditions under a nitrogen atmosphere, had an orientation angle of 16°, was of medium-to-high crystallinity, had a T/E/Mi at room temperature of 12/5/272 and a T/E/Mi at 150° C of 8/5/212.

All the polymers in the preceding Examples had values of $n$ in excess of 10.

I claim:

1. The thermally stable, rigid, ordered polyesters of the formula

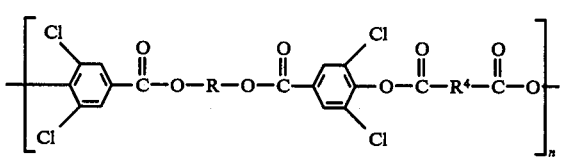

where R is

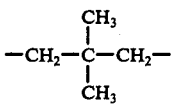

or

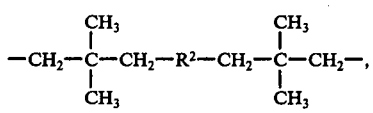

where
$R^2$ is an arylene selected from the group consisting of 1,4-phenylenes, 4,4'-biphenylenes, and 2,6-naphthylenes, said arylene being unsubstituted or substituted with halo, lower alkyl or phenyl,
$R^4$ is an arylene selected from the group consisting of 1,4-phenylenes, 4,4'-biphenylenes, 4,4'-biphenylene oxides, and 2,6-naphthylenes, said arylene being unsubstituted or substituted with halo, lower alkyl or phenyl, and
$n$ is at least 10.

2. The polyester of claim 1 of the formula

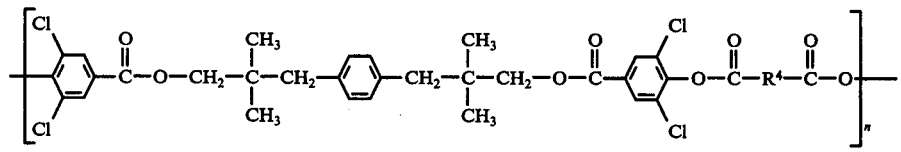

3. The polyester of claim 2 in which $R^4$ is 1,4-phenylene.

4. The polyester of claim 2 in which $R^4$ is 4,4'-biphenylene.

5. The polyester of claim 2 in which $R^4$ is 2,6-naphthylene.

6. The polyester of claim 1 of the formula

7. The polyester of claim 6 in which $R^4$ is 1,4-phenylene.

8. The polyester of claim 6 in which $R^4$ is 4,4'-biphenylene.

9. The polyester of claim 6 in which $R^4$ is 2,6-naphthylene.

* * * * *